July 19, 1938.                R. H. DRAEGER                2,123,882
                    READING ATTACHMENT FOR MICROSCOPES
                          Filed April 8, 1936           2 Sheets-Sheet 1
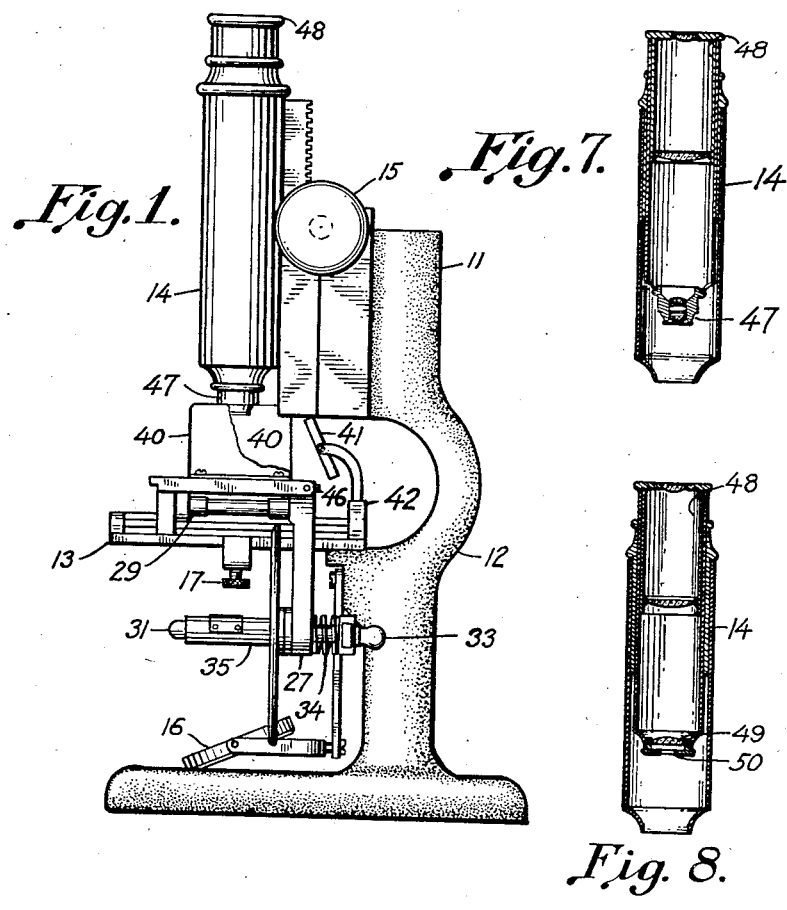
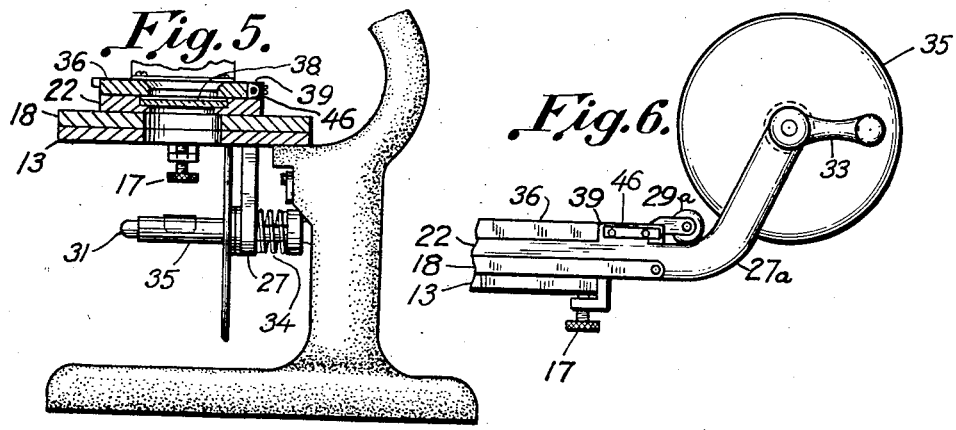
INVENTOR
*Rupert H. Draeger.*
BY
*Robert A. Lavender,*
ATTORNEY July 19, 1938.    R. H. DRAEGER    2,123,882
READING ATTACHMENT FOR MICROSCOPES
Filed April 8, 1936    2 Sheets-Sheet 2
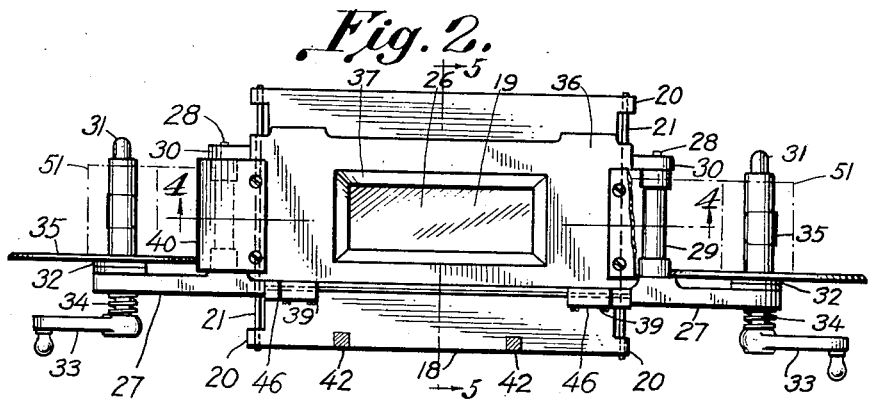
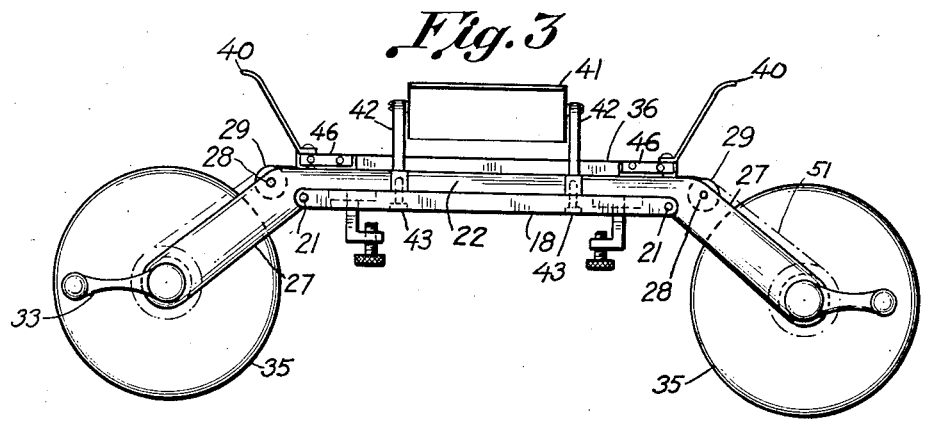
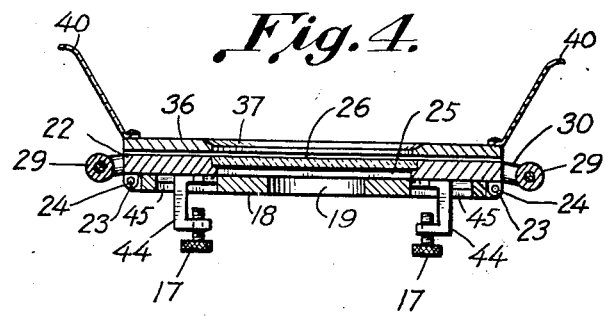
INVENTOR.
RUPERT H. DRAEGER.
BY
ATTORNEYS.

Patented July 19, 1938

2,123,882

UNITED STATES PATENT OFFICE 2,123,882

READING ATTACHMENT FOR MICROSCOPES

Rupert H. Draeger, United States Navy

Application April 8, 1936, Serial No. 73,224

1 Claim. (Cl. 88—39)

(Granted under the act of March 3, 1883, as amended April 30, 1928; 370 O. G. 757)

This invention relates to a microscope attachment which converts the microscope into a reading machine for information recorded in miniature.

A principal object of this invention is to provide a non-expensive solution to the problem of reading miniature film copy or paper prints.

A large part of the miniature copy now available is on motion picture film at a reduction of from ten to twenty diameters from the original. When the average printed page is reduced to this extent it becomes entirely unreadable to the naked eye. In order to read such miniature print it is necessary to have from five to fifteen diameters magnification. Furthermore, when a page is reduced to a standard movie frame size a single line is nearly three-fourths of an inch in length and hence a wide angle optical system is required to cover this field at this magnification.

This combination of requirements necessarily adds much to the expense of a reading device. The various inexpensive film viewing devices which are now available do not meet these requirements and are therefore inadequate for protracted reading without undue eye strain and fatigue.

The object of this invention, therefore, is to provide an inexpensive means of utilizing the high quality optical equipment of existing microscopes, particularly the low power binocular dissecting microscopes, for reading miniature print and illustrations on a strip of film or tape.

Since it is possible to record information on nearly any strip material or tape, it is a further object of this invention to adapt this device to accommodate any of the possible types of strip copy having the form of tape. The dimensions of the tape, of course, must be considered when the device of this invention is being constructed. Scientific literature is now available in miniature on motion picture film and therefore, the embodiment of this invention illustrated in the accompanying drawings has been chosen to accommodate that size tape. Thus, since microscopes are available in schools and laboratories all over the world, through the combination of this invention with the existing potential means for making this source of information more useful without excessive cost, there is readily produced a conveniently operated reading machine of the quality desired.

This reading attachment is made so that it may be secured to the stage of a microscope. It consists principally of a film gate, guide rollers, and spindles with hand cranks mounted at each end. The spindles receive film spools and may be turned in either direction. The film gate and spindle mounts slide with respect to the base of the device which is attached to the microscope stage. This motion is to permit of movement of the field of view across the film which adjustment may be used to follow the lines down a page photographed cross-wise on motion picture film or to switch from column to column if newspaper pages are copied lengthwise of the film strip. If film copy is used, the microscope mirror is used in the customary manner to reflect the light through the film. A pivoted mirror above the film gate is included on the attachment to reflect light onto the upper surface when opaque copy is used.

For reading a strip that is too short to be wound on the spools, wing guides have been provided to eliminate the possibility of the strip curling and cutting off the field of view.

If 16 mm. movie film is used, the desired field is covered by using a 32 mm. objective lens in the microscope with a low power ocular. A shorter focal length objective lens giving the desired increase in magnification is better for 8 mm. film. Likewise, a longer focal length objective lens is desirable when the field must cover a three-fourths of an inch line on 35 mm. motion picture film. However, this is not necessary if the distance between the objective lens and the ocular can be shortened by screwing the objective lens within the lens tube instead of on its lower end.

It is obvious that if the copy has been placed lengthwise of the strip there is no difficulty in turning the microscope through ninety degrees so that the lines will be erect.

In the accompanying drawings:

Fig. 1 is a side elevation of a microscope having mounted thereon the attachment of this invention;

Fig. 2 is a plan view of the reading attachment;

Fig. 3 is an elevation of the device;

Fig. 4 is a sectional elevation at line 4—4 of Fig. 2;

Fig. 5 is a sectional elevation at line 5—5 of Fig. 2 showing the device mounted on a microscope stage;

Fig. 6 is an elevation of an alternative method of construction, being a modification of the construction shown in Fig. 3;

Fig. 7 is a sectional view of the microscope lens tube showing an alternative mounting for the objective lens; and Fig. 8 shows a simplification of the optical system of Fig. 7.

There is shown at Fig. 1 a conventional microscope having a frame 12, a stage 13, an adjustable light reflecting mirror 16, and lens tube 14 vertically adjustable on a rack and pinion by means of hand wheel 15, with the device of this invention removably secured to the stage 13 by means of the thumb screws 17. The reading attachment of this invention comprises a substantially rectangular base plate 18 having an aperture 19 and four bosses 20 through which rods 21 are secured. A film gate plate 22, is mounted for transversely sliding on the rods 21, which pass through apertures 23 extending through flanges 24. The film gate plate 22 carries a transparent plate 26, mounted in an aperture 25, level with the top of the tape carrying groove 38, Fig. 5. Extending downwardly from the plate 22 are the arms 27 in which are journaled one end of axles 28 of guide rollers 29, the other ends being journaled in each of the lugs 30 extending from the film gate 22. Spool carrying spindles 31 provided with flanges 32 and journaled in the ends of arms 27 are rotatable by means of crank handles 33. Helical compression springs 34 mounted upon the spindles 31, between the arms 27 and the hubs of cranks 33, create sufficient friction between the flanges 32 and the arms 27 to prevent coasting of either spindle when the strip material is wound from one spindle to the other. Single flanged spools 35 are used to pass miniature image bearing tape 51 over glass plate 26.

A cover plate 36, provided with a beveled aperture 37 slightly smaller than and directly over the glass plate 26, is hinged to the film gate plate 22 as at 39 so that the strip material 51 will be held flat while light from mirror 16 may be reflected therethrough. This cover plate 36, however, may be omitted, the groove 38 sufficing to guide the tape 51 which is held taut by the friction on spindle flanges 32.

Light weight guide wings 40 are secured to the upper plate 36 so that when short strips of copy having a tendency to coil are used, the loose ends will be kept out of the field of view.

A tiltable mirror 41 is secured by means of posts 42 and screws 43 to the plate 22. Brackets 44 carrying the thumb set screws 17 are adjustable in grooves 45 in base plate 18 so that the device may fit various size microscope stages. This is best shown in Fig. 4.

For microscopes having a stage set too low to permit the spool 35 to clear the table upon which the microscope rests the modification shown in Fig. 6 is used. In this case the support arms 27a are inclined upwardly and guide rollers 29a are secured to the hinged cover 36 of the film gate instead of to plate 22 as shown in the other figures.

In either case the hinged cover 36 is raised to place the strip in the film gate, the strip going over the guide rollers 29 in the first case and under them in the second. Leaf springs 46 secured to hinge portions 39 of film gate plate 22 bear against the flat top surface of the cover plate 36 when it is in the open position, and against the flat rearward surface, when it is in the closed position, thus holding it in either one position or the other. In Fig. 1, the objective 47 is shown mounted at the bottom of the lens tube 14 while the ocular 48 is mounted at the top as is customary.

In Fig. 7 is illustrated an alternative method of mounting the objective lens 47 within the lens tube 14 in order to shorten the distance between the objective 47 and the ocular 48. This method of mounting not only permits the use of a longer focal length objective when a larger field is desired but also enlarges the field by the shortening of the objective-ocular distance. Fig. 8 shows a simple lens 49 and a stop 50, detachably mounted within lens tube 14 in place of the low power microscope objective 47.

To use the device of this invention it is merely necessary to attach it to the stage of an ordinary microscope and to mount the proper power ocular and objective in the microscope lens tube. In the inherently low power wide angle microscopes, of the dissecting type, often no change in the optical system is necessary to accommodate it for reading miniature images on 16 mm. or 35 mm. strip copy. In the ordinary high power microscope of either the monocular or binocular type it is necessary to use a low power objective in order to cover the length of line of a page filling a standard frame of 16 mm. or 35 mm. film. If the images are extremely small, as in the case when a number of pages are placed on one frame of 16 mm. or 35 mm. film, a higher power will be necessary, utilizing the proper objective lens to cover the line to be read. If these optical systems do not cover the whole page it is merely necessary to shift the film carriage as the reading progresses down the page. In the case of the extremely small images this shift may be used to bring another page into the microscope field.

When transparent film is used the microscope mirror must be adjusted to illuminate the copy from the under side. If opaque copy is used the mirror on this device is used in place of the microscope mirror to direct light from any source onto the face of the copy.

To load the reading device the spool containing strip copy is placed on one of the spindles, the film gate is opened, the loose end of the strip is pulled across to the other spindle and secured thereto. The film gate cover, if one is present, is then closed, the take-up spindle cranked to bring the desired area of the copy into the field and the microscope focused for clear vision.

The invention described herein may be manufactured and used by or for the Government of the United States of America for governmental purposes without the payment of any royalties thereon or therefor.

I claim:

A film-reading attachment for microscopes, comprising a film-gate consisting of a base-plate having an aperture, a clamp for fastening said plate to a microscope stage, a pair of rods secured to said plate, a gate-plate slidably mounted on said rods, a transparent plate mounted in said gate-plate in alinement with the said aperture, the top surface of said transparent plate being below the top surface of said gate-plate, a cover-plate hinged to said gate-plate and having a beveled aperture smaller than and above said transparent plate, and light reflecting means including a mirror mounted below said stage and a mirror mounted above said stage adapted to direct light to a film in said stage as required, whereby minute print on the film may be read.

RUPERT H. DRAEGER.